Dec. 17, 1929.  H. HASTING  1,740,173
TIRE VALVE
Filed Dec. 5, 1927
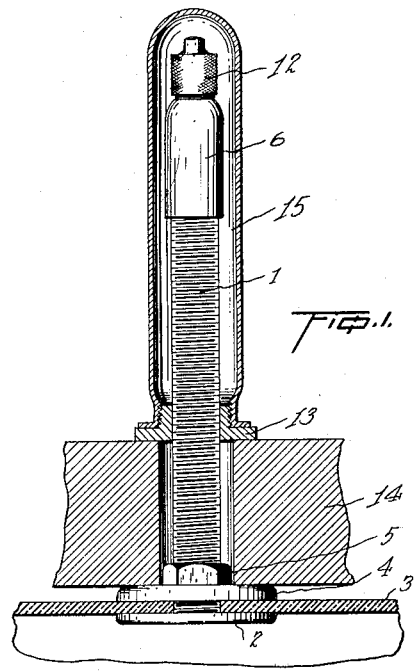
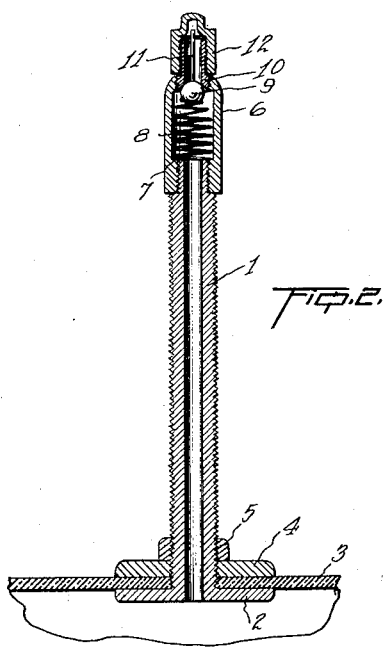
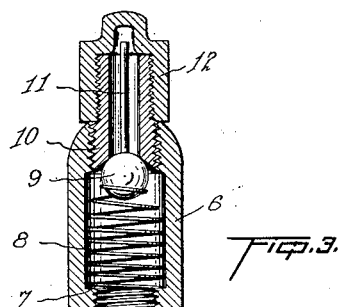
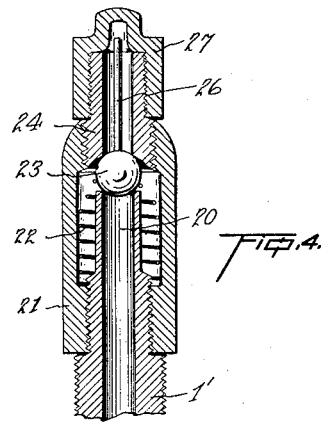
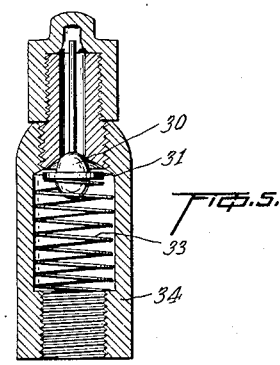
Inventor
*Homer Hasting*
By
Attorney Patented Dec. 17, 1929

1,740,173

UNITED STATES PATENT OFFICE

HOMER HASTING, OF DETROIT, MICHIGAN

TIRE VALVE

Application filed December 5, 1927. Serial No. 237,762.

The present invention pertains to a novel valve constructed for application to the standard form of valve stem on automobile and bicycle tires, where the standard Schrader valve has been used or it may be used as an independent valve.

The principal object of the invention is to provide a simple and effective device of this character in which a ball valve backed by a spring is employed as the closure means. While in the prior devices of this general character the closure member applies only to the valve seat, the present invention provides a device wherein the ball may be clamped between the valve seat and the end of the hollow valve stem.

The invention is fully disclosed by way of example in the following description and in the accompanying drawing, in which—

Figure 1 is a longitudinal section of a tire valve constructed according to the invention, showing parts thereof in elevation;

Fig. 2 is a longitudinal section of the valve stem and seat;

Fig. 3 is an enlarged detail thereof;

Fig. 4 is a similar section of a modification; and

Fig. 5 is a section of still another modification.

Reference to these views will now be made by use of like characters which are employed to designate corresponding parts throughout.

The stem of the valve is a hollow threaded tube 1 having at its lower end a flange 2 engaging the inner surface of an inner tube 3. A washer 4 is screwed down on the valve stem towards the tube whereby the latter is clamped against the flange 2, and the washer is held by a locknut 5.

On the outer end of the stem 1 is threaded a valve casing 6 having an internal shoulder 7 on which is mounted a spring 8. A ball valve 9 is mounted on the spring and is adapted to cooperate with a valve seat member 10 threaded on the top of the casing. A pin 11 is disposed axially in the seat member and rests on the ball as clearly shown in Figures 2 and 3. Finally, a cap 12 is threaded over the seat member.

The spring normally holds the valve closed and thus prevents escape of air when the cap 12 is removed in pumping the tire. The air pipe for supplying air to the tire is generally of such a construction as to push inwardly on the pin and remove the ball valve from its seat when applied to the seat member. Obviously, when the pipe is removed from the seat member, the spring will return the ball to closing position.

In Figure 1 the stem 1 is shown as having a nut 13 threaded thereon and engaging the rim of felloe 14. A cover 15 is slipped over the stem 1 and is threaded on the nut.

Figure 4 illustrates a construction for providing a more secure seal in the valve. In this case the stem 1' is extended as at 20 into the surrounding casing 21. A spring member 22 surrounds the extension and supports the ball valve 23. The casing carries a seat member 24 in the manner already described, and this member may serve to clamp the ball against the extension 20 when the casing 21 is screwed down on its threaded connection with the tube 1'. A pin 26 and cap 27 are provided in the manner already described in connection with Figures 2 and 3.

In the form shown in Figure 5 the valve 30 is egg shaped and provided with a collar 31 around its smaller perimeter. This collar rests on a spring 33 disposed in the usual casing 34.

Although specific embodiments of the invention have been illustrated and described, it will be understood that various alterations in the details of construction may be made without departing from the scope of the invention as indicated by the appended claim.

What I claim is:

In a tire valve, a threaded hollow stem, a casing having a shoulder threaded on said stem, a valve seat in said casing, a coil spring adapted to surround said stem and supported on said shoulder in said casing, and a ball check valve mounted on said spring for cooperating with said valve seat.

In testimony whereof I affix my signature.

HOMER HASTING.